Sept. 5, 1933.　　　P. A. ELFERS　　　1,925,957
PILOT DIFFERENTIAL PRESSURE CONTROL
Filed Aug. 22, 1931　　　2 Sheets-Sheet 1

Inventor
P. A. Elfers,
Prevost & Prevost
Attorneys

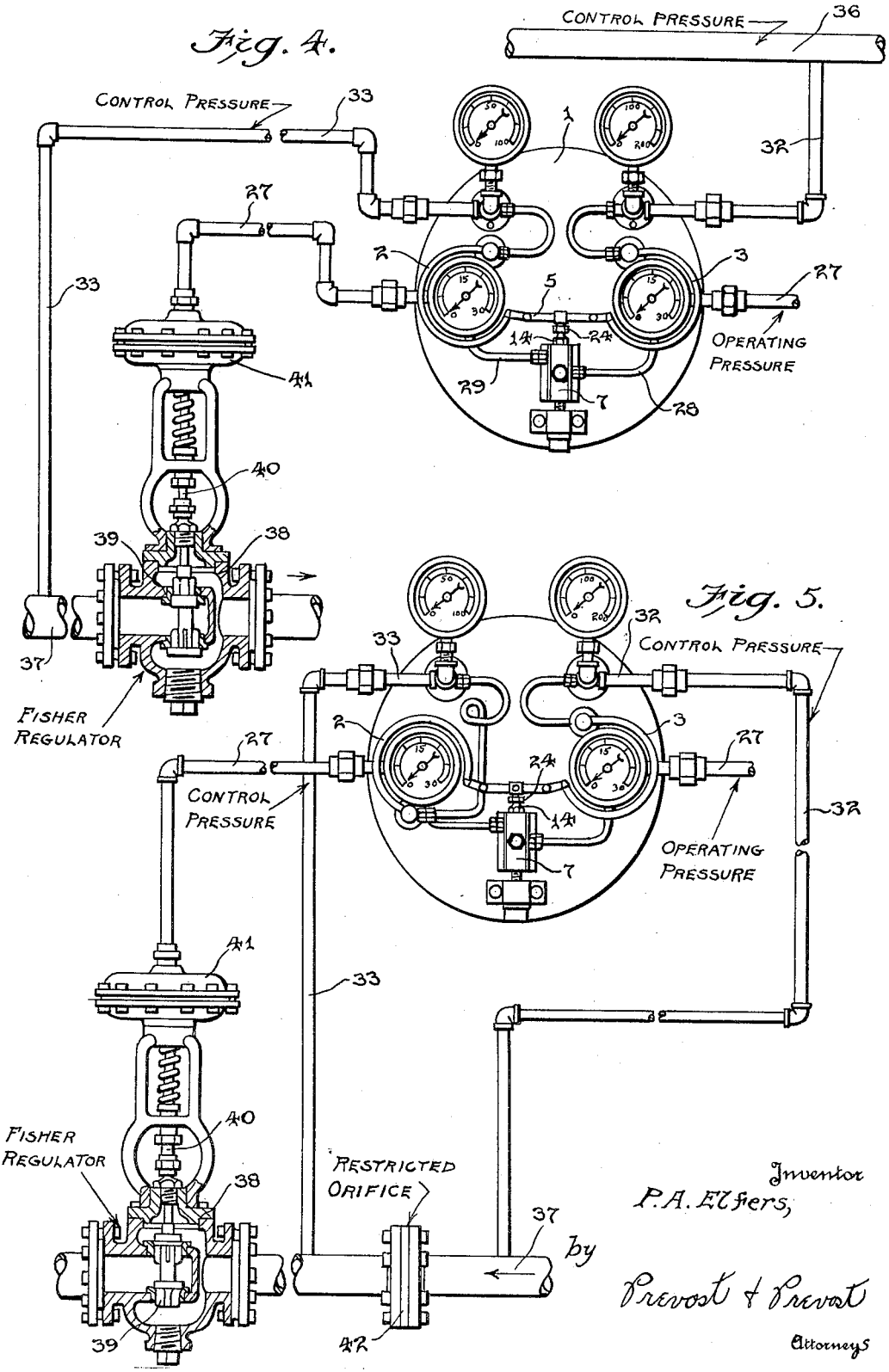

Patented Sept. 5, 1933

1,925,957

UNITED STATES PATENT OFFICE 1,925,957

PILOT DIFFERENTIAL PRESSURE CONTROL

Paul A. Elfers, Marshalltown, Iowa, assignor to The Fisher Governor Company, Marshalltown, Iowa Application August 22, 1931. Serial No. 558,816

1 Claim. (Cl. 137—164)

My invention consists in new and useful improvements in a pilot differential pressure control and has for its object to provide an arrangement particularly adapted to maintain a definite or fixed pressure between two control pressures by the use of two Bourdon tubes or other suitable pressure responsive elements, to vary the position of a floating pilot valve according to the differential pressures applied to said Bourdon tubes or pressure responsive elements. I arrange these elements so that there is always a relation between the position of the seat on the pilot valve and the main valve to be controlled, which is first determined by the pressures which actuate the pressure responsive elements.

It will be noted that this present invention is an amplification of the principle and structure illustrated and described in my co-pending application Serial No. 420,732, filed January 14, 1930, covering a pilot pressure control embodying a single Bourdon tube or pressure responsive element, and that the operation of the individual control elements in the present application is ostensibly the same as the single control element in said former application.

The principle of my invention may be employed in various modified adaptations for effecting differential pressure and/or vacuum control. For instance, it may be installed in apparatus wherein one controlling pressure is taken from one pipe line for actuating one of the pressure responsive elements and the other controlling pressure is taken from another pipe line for controlling the adjacent pressure responsive element, the operating pressure characteristics of one pipe line controlling the operating pressure characteristics of the other.

Another adaptation to which my invention is applicable is for regulating a definite differential pressure across an orifice plate or other restriction in a pipe line. It is known that with an orifice plate, Venturi tube, valve or the like, installed in a pipe line, liquid flowing through the restricted orifice has a slightly lower pressure on the discharge side of the orifice than the pressure on the inlet side of said orifice, the greater the flow of liquid or fluid through this orifice, the greater will be the difference in pressure between the inlet and outlet sides.

I have taken advantage of this phenomena in designing this particular adaptation of my invention. One of the pressure responsive elements is controlled and actuated by the pressure on the down-stream side of the orifice plate or the like, and the other is controlled and actuated by the pressure on the up-stream side of the orifice, the variations of these two pressures acting upon the pressure responsive elements to control a pilot valve which in turn controls the position of a main valve.

With the above and other objects in view which will appear as the description proceeds, my invention consists in the novel features herein set forth, illustrated in the accompanying drawings, and more particularly pointed out in the appended claims.

Referring to the drawings in which numerals of like character designate similar parts throughout the several views.

Figure 1:
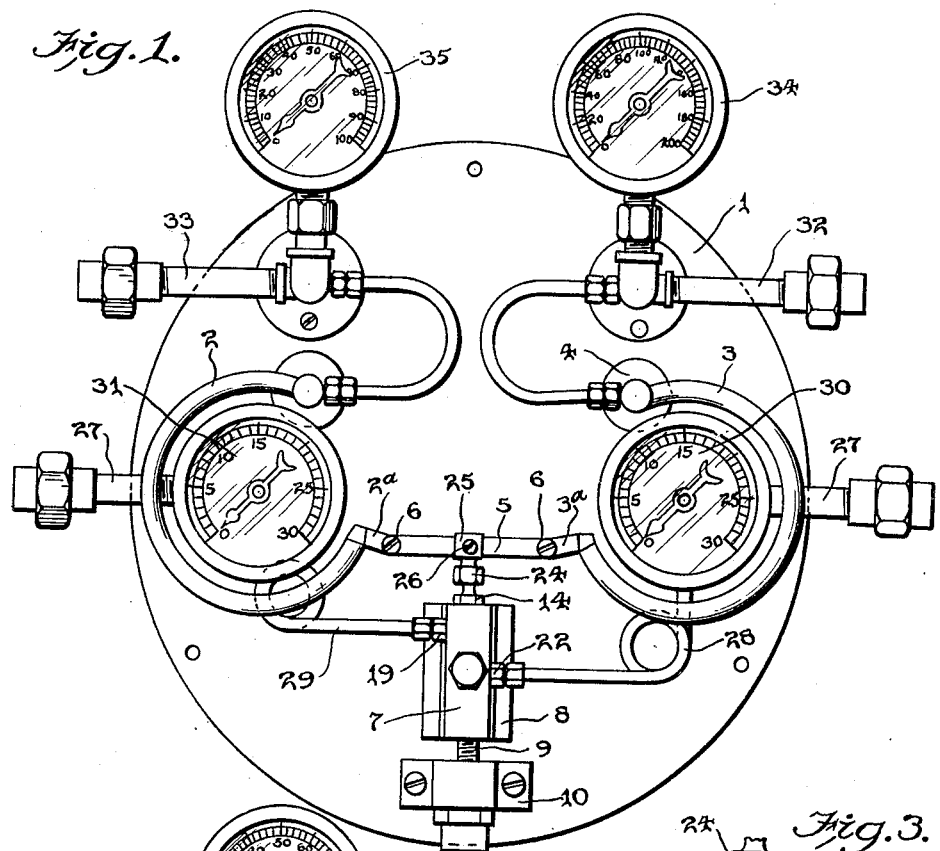
Fig. 1 is an enlarged view in front elevation showing the control elements assembled in one form.
Figure 2:
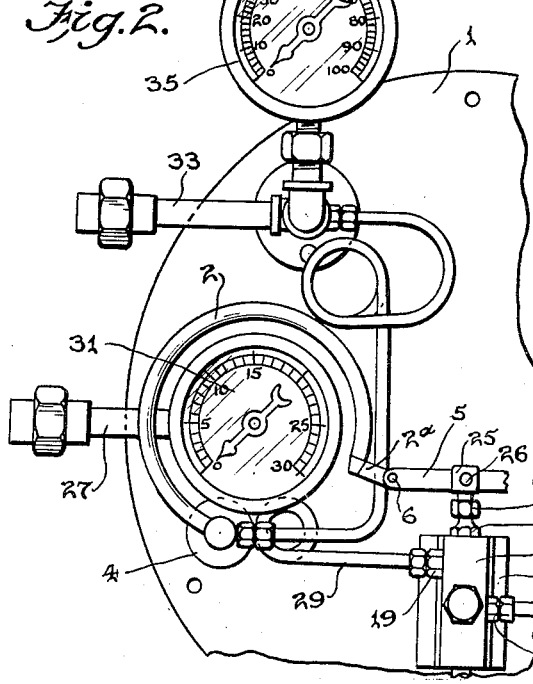
Fig. 2 is a fragmentary view similar to Fig. 1 but showing the pressure responsive elements in inverted position for use in another form of installation.

Fig. 4 is a view showing a typical installation of the device illustrated in Fig. 1 wherein the operating characteristics of one pipe line control the operating characteristics of another pipe line, and Fig. 5 is a similar view showing the installation of the device illustrated in Fig. 2 in an apparatus involving an orifice plate and wherein the pressures on opposite sides of the orifice plate are employed as the control pressures to maintain a balanced constant pressure relation or differential between the two.

In the drawings, 1 represents a base or support for carrying the various elements of the control unit and is adapted to be secured to a suitable foundation by any appropriate means such as screws or bolts. On either side of the vertical center of the base 1, I mount Bourdon tubes or other pressure responsive elements 2 and 3 which are secured in place at one end by any suitable means 4, such for example, as the Bourdon tube supports shown and described in my co-pending application above referred to. The free ends of the Bourdon tubes 2 and 3 preferably terminate in arms 2a and 3a respectively, which project angularly from the Bourdon tubes, toward one another and are interconnected by a floating pilot valve lever 5 which is pivotally secured at each end to the respective arms 2a and 3a by suitable pins or bolts 6.

7 represents an adjustable pilot valve block similar to that described in my co-pending application and supported on the base 1 by a suitable channel guide 8 whereby the block is vertically adjustable by means of a threaded adjusting screw 9 carried by a support 10 fastened to the face of the base 1. The block 7 is drilled and threaded longitudinally from its upper end as at 11, the lower end of which aperture opens into a strainer chamber 12, perpendicular thereto. 13 designates a pilot valve seat plug which is threaded to engage the threads in the aperture 11, the upper end of said plug supporting a valve seat 14. The valve seat structure is centrally and longitudinally drilled from its upper end as at 15 to form a port which extends to a point near the lower end of the plug 13. It is also drilled longitudinally from its lower end as at 16 to form a substantially smaller port than that designated as 15, both of said ports 15 and 16 being in alignment and in communication with one another.

A transverse port 17 is provided in the plug 13 in communication with the longitudinal port 15 at its inner end, and at its outer end with the port 18 of a threaded plug 19 which is screwed into a transverse threaded aperture 20 in the block 7. The seat plug 13 is preferably circumferentially recessed adjacent the port 17 to insure the communication of the ports 17 and 18.

Figure 3:
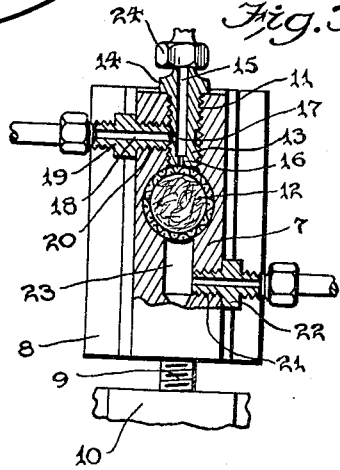
Fig. 3 is an enlarged sectional view of one form of adjustable ported block carrying the pilot valve seat and strainer which may be installed in the operating pressure conduit leading to the main valve.

At the lower end of the block 7 on the side opposite the plug 19, in the form shown in Fig. 3, I provide another transverse threaded aperture 21 adapted to receive a threaded and ported plug 22 which is in communication with the strainer chamber 12 by means of a second longitudinally extending conduit 23 in the lower portion of the block 7. In the form shown in the other figures, this lower plug is connected into the block 7 adjacent the strainer chamber 12 and the port 23 is eliminated.

The port 15 in the valve seat 14 is adapted to be closed or throttled by a pilot valve head 24 suspended from the valve lever 5 at a point substantially centrally of the ends thereof, said valve head being supported on the lever 5 by a suitable yoke 25, held in position by a bolt or the like 26.

This ported block and valve seat assembly is interposed in an auxiliary operating pressure conduit 27 by means of pipe lines 28 and 29, the former leading from the up-stream side of the conduit 27 to the threaded plug 22 and the latter leading from the threaded plug 19 to the down-stream side of the conduit 27, said conduit being provided with suitable pressure gauges 30 and 31 on the respective sides of the pilot valve block 7. It will be noted that as in my other application this operating pressure medium may be in the form of air, gas or any suitable fluid to develop the force for actuating the main controlling valve.

The Bourdon tubes 2 and 3 are in communication with two separate sources of control pressure hereinafter referred to more in detail, by conduits 32 and 33 respectively, said conduits having interposed therein suitable pressure gauges 34 and 35. Thus when the pressure in either of the conduits 32 or 33 increases, in the arrangement shown in Fig. 1, the respective Bourdon tube is extended and through the medium of the pivotally mounted valve lever 5, brings the valve head 24 into engagement with the seat 14 to close the pilot valve. Upon the reduction in pressure or the occurrence of a vacuum in the conduits 32 and 33, the respective Bourdon tube is retracted and opens the pilot valve.

In the assembly shown in Fig. 2 the Bourdon tubes are inverted, thus operating to open the pilot valve upon the extension of the Bourdon tubes and to close said valve upon the retraction of the Bourdon tubes.

Referring to Fig. 4 which illustrates one installation of the assembly shown in Fig. 1, 36 represents a line leading from a separate system, the source of control pressure, and is connected into the conduit 32, whereby the Bourdon tube 3 is responsive to the pressure condition in the line 36. 37 represents a main pipe line, the operating pressure characteristics of which are to be controlled by the operating pressure characteristics of the pipe line 36, said pipe line 37 being provided with a suitable valve assembly 38 equipped with an inner valve 39, the stem 40 of which extends upwardly and is operatively connected to a diaphragm in diaphragm chamber 41. The upper half of diaphragm chamber 41 is in communication with the operating pressure line 27 on the down-stream side of the pilot valve block 7, whereby when the pilot valve head 24 is in closed position on the seat 14, the full operating pressure is transmitted to the upper chamber of the diaphragm 41 which forces the diaphragm downwardly and operates to open the main valve 39 through the medium of the stem 40. When the valve head 24 is in open position, the operating pressure escapes through the port 15 which results in a reduction of pressure in the line 27 and consequently there is no downward opposition to the main valve spring and the inner valve 39 is closed, all as hereinafter set forth more in detail.

Conduit 33 in this installation is arranged to place the Bourdon tube 2 in communication with the main pipe line 37 at a point anterior to the main valve 38, whereby the Bourdon tube 2 is responsive to the pressure condition existing in the main pipe line.

Thus, with an increase in the control pressure in line 36 the Bourdon tube 3 is extended and through the medium of the valve lever 5, closes the pilot valve head 24 against the seat 14, permitting the pressure to build up in conduit 27 and the intermediate connecting pipe lines 28 and 29, to open the inner valve 39. This naturally relieves the pressure in the main line 37 by permitting the escape of the fluid therein.

Now, when the pressure in the pipe line 37 anterior to the main valve 38 has fallen below a predetermined degree, this condition is transmitted to the second Bourdon tube 2 which upon reduction in pressure is permitted to retract and through the medium of the valve lever 5, opens the pilot valve 24 and allows the operating pressure in line 27 to escape. Consequently, upon the reduction in pressure in the operating pressure conduit, the pressure in the upper chamber of the diaphragm 41 is in turn reduced which permits the closing of the inner valve 39, whereupon the pressure in the main line 37 assumes a new value, as dictated by the pressure in line 36 and position of its responsive element 3.

On the other hand, the arrangement of this particular installation is such that when the control pressure in line 36 decreases, the pressure in the main line 37 will be automatically caused to increase. Thus when pressure in line 36 is reduced, this condition is transmitted to the Bourdon tube 3 which contracts and opens the pilot valve 24. As before stated, this results in the closing of the inner valve 39 in the main line and the building up of pressure in said line.

This pressure is prevented from increasing beyond a predetermined degree by the action thereof upon the Bourdon tube 2 through conduit 33. The expansion of the Bourdon tube 2 closes the pilot valve 24 and permits the operating pressure to build up in line 27, thus opening the main inner valve 39.

It will thus be seen that with this particular form of installation, a definite pressure relation may be automatically maintained between two conduits or zones, whereby when the control pressure in one zone increases, the pressure in the other zone decreases and when the control pressure in said first mentioned zone decreases, the pressure in the second zone increases.

Although the general principle of operation of the installation illustrated in Figs. 2 and 5 is similar to that just described, the purpose and details of arrangement and operation are somewhat different.

In this form of my invention the arrangement is such as to maintain a definite differential pressure across the orifice plate 42 for example, which is interposed in the main pipe line 37 and it will be noted that instead of a separate and distinct control pressure for regulating the operating conditions in the pipe line 37 as in the structure shown in Fig. 4, in this modification, the flow of gaseous or liquid fluid through the restricted orifice in plate 42 is the same fluid which flows through the main valve 38 and which is to be regulated.

It will be noted that the Bourdon tube 2 is inverted and arranged to open the pilot valve 24 upon its expansion and to close the same upon its contraction, while the Bourdon tube 3 is arranged the same as heretofore described, to close the pilot valve upon its expansion and to open the same upon its contraction. In other words, the action of one tube tends to close the port 15 in valve seat 14, while the other tube tends to open the same for respective changes of the two controlling pressures.

It will also be noted that the inner valve 39 in the main valve 38 is arranged opposite to that shown in Fig. 4, and opens upon its upward movement.

The Bourdon tube 3 is in communication with the up-stream side of the orifice plate through the medium of conduit 32, while the Bourdon tube 2 is in communication with the down-stream side of the orifice plate through the medium of conduit 33, the operating pressure conduit 27 being connected to the diaphragm chamber 41 of the main valve 38 as in the case of the former installation.

In the operation of the apparatus shown in Fig. 5, I take advantage of the fact that liquid flowing through the orifice plate or the like has a slightly lower pressure on the discharge side of the plate than the pressure which occurs on the inlet side thereof and that the greater the flow of liquid or fluid through this orifice plate, the greater will be the difference in pressure between the inlet and outlet sides. Thus, if the pressure on the down-stream side of the orifice plate decreases, resulting in a greater flow of fluid through the orifice, this contracts the Bourdon tube 2 and closes the pilot valve which permits the operating pressure to build up in line 27 to close or throttle the main inner valve 39. Should the down-stream pressure increase, the Bourdon tube 2 is expanded to open the pilot valve and in turn the main valve 39.

An increase in pressure on the up-stream side of orifice plate 42 expands the Bourdon tube 3, closing the pilot valve and in turn closing or throttling the main valve 39, while a decrease in pressure on the up-stream side results in the opening of the pilot valve through the contraction of the Bourdon tube 3, and in turn opens the main valve 39. It will thus be seen that with this arrangement it is possible to maintain a definite difference in pressure between the inlet and outlet sides of the orifice plate and that as the differential pressure between the two sides increases, this results in the closing of the main valve, while if a decrease in pressure occurs for the two positions, the main valve is at once opened. By automatically holding a definite differential pressure across the orifice plate there is a definite volume of fluid passing through the main line for a given period of time.

The Bourdon tubes 2 and 3 may be properly sized and rated as to sensitiveness so as to obtain various ratios between the two tubes. For example, they may be arranged to maintain a relation of one to one for certain conditions and in certain installations, and again they may be so constructed as to maintain a ratio of three to one on either side.

By adjusting the vertical position of the ported block 7 through the medium of the adjusting screw 9, the relative positions of the valve head 24 and pilot valve seat 14 may be varied as in the case of my co-pending application heretofore mentioned.

While I have shown and described the foregoing installations, it is obvious that numerous other arrangements may be designed to suit varying conditions and I in no way intend to limit myself to those particular adaptations. Furthermore, the arrangement of inner valves and Bourdon tubes may be reversed or it may be desirable in a unit of the character shown in Fig. 5 to place the orifice plate or the like in a separate line, independent of the line in which the main valve is placed. In such an arrangement the flow of liquid or gaseous fluid through the main valve could be maintained in definite proportions to the flow of a second and different kind of liquid or gaseous fluid flowing through the orifice plate. It will be noted that the orifice plate shown in Fig. 5 is purely for the purpose of illustration, and may be replaced in actual practice, by a Venturi tube or any restriction in the line.

In closing it may be stated that while I have referred generally throughout the above description to "pressures", I mean this term to be construed in its broadest sense and to include pressures both above and below atmospheric pressure. Obviously, my invention is equally as applicable to vacuum control as to pressure control.

From the foregoing it is believed that my invention may be readily understood by those skilled in the art without further description, it being borne in mind that numerous changes may be made in the details of construction without departing from the spirit of the invention as set forth in the following claim.

What I claim and desire to secure by Letters Patent is:—

Apparatus of the character described comprising a main pipe line, a valve for controlling the flow of fluid through said pipe line, a conduit for conducting a valve operating fluid, a jet flow outlet in said conduit, a second pipe line constituting a source of control pressure, a pressure responsive element in communication with said second pipe line, a second pressure responsive element in communication with said main pipe line, a floating toggle lever carried by and interconnecting said pressure responsive elements, a valve carried by said lever for controlling said jet flow outlet, and means actuated by said valve operating fluid for operating said main valve, whereby the operating pressure characteristics of said second pipe line control the operation pressure characteristics of the main pipe line.

P. A. ELFERS.